US007894774B2

(12) United States Patent
Darwood (10) Patent No.: US 7,894,774 B2
(45) Date of Patent: Feb. 22, 2011

(54) COMMUNICATION UNIT AND METHOD FOR INTERFERENCE MITIGATION

(75) Inventor: Peter B. Darwood, Bristol (GB)

(73) Assignee: Wireless Technology Solutions LLC, New York, NY (US)

( * ) Notice: Subject to any disclaimer, the term of this patent is extended or adjusted under 35 U.S.C. 154(b) by 719 days.

(21) Appl. No.: 11/890,028

(22) Filed: Aug. 2, 2007

(65) Prior Publication Data
US 2009/0036083 A1 Feb. 5, 2009

(51) Int. Cl.
H04B 1/00 (2006.01)
H03D 1/06 (2006.01)
(52) U.S. Cl. .................. 455/63.1; 455/296; 455/501; 375/148; 375/348
(58) Field of Classification Search ............. 455/63.1, 455/278.1, 296, 303, 304, 306, 312, 501, 455/502; 375/134, 144, 145, 148, 149, 346, 375/348
See application file for complete search history.

(56) References Cited

U.S. PATENT DOCUMENTS

| 5,602,531 | A | * | 2/1997 | Rude et al. ............... 340/572.4 |
|---|---|---|---|---|
| 5,825,835 | A | * | 10/1998 | Kingston et al. ............ 375/367 |
| 5,930,229 | A | * | 7/1999 | Yoshida et al. .............. 370/203 |
| 6,301,289 | B1 | | 10/2001 | Bejjani et al. |
| 6,665,334 | B1 | * | 12/2003 | Wichman et al. ........... 375/148 |
| 6,885,656 | B2 | * | 4/2005 | Sashihara ................... 370/350 |
| 7,430,253 | B2 | * | 9/2008 | Olson et al. ................. 375/316 |
| 7,443,908 | B2 | * | 10/2008 | Simoni et al. ............... 375/148 |
| 7,526,036 | B2 | * | 4/2009 | Mehta et al. ................ 375/260 |
| 7,769,094 | B2 | * | 8/2010 | Wilhelmsson ............... 375/260 |
| 2002/0037737 | A1 | * | 3/2002 | Learned et al. ............. 455/526 |
| 2003/0108091 | A1 | | 6/2003 | Nishio et al. |
| 2006/0153283 | A1 | * | 7/2006 | Scharf et al. ................ 375/148 |
| 2008/0112518 | A1 | * | 5/2008 | Wilhelmsson ............... 375/348 |
| 2008/0118012 | A1 | * | 5/2008 | Corke et al. ................ 375/348 |
| 2008/0293371 | A1 | * | 11/2008 | Kishigami et al. ........ 455/278.1 |
| 2010/0184380 | A1 | * | 7/2010 | Zhou et al. ................. 455/63.1 |

OTHER PUBLICATIONS

International Search Report Dated Nov. 21, 2008 from PCT/EP2008/059373.

* cited by examiner

*Primary Examiner*—Duc M Nguyen
(74) *Attorney, Agent, or Firm*—Fitch Even Tabin & Flannery (57) ABSTRACT

A communication unit comprises a receiver for receiving a composite communication signal that comprises a desired signal and at least one asynchronously received interfering signal. The receiver comprises detector logic arranged to detect and process the composite communication signal as if the at least one asynchronously received interfering signal were synchronously received with the desired signal.

27 Claims, 5 Drawing Sheets

COMMUNICATION UNIT AND METHOD FOR INTERFERENCE MITIGATION

FIELD OF THE INVENTION

The field of this invention relates to a wireless communication unit for receiving a desired signal in a presence of an asynchronously received interference signal. The field of this invention is applicable to, but not exclusively limited to, a multi-user detector for use in UTRA (UMTS—Universal Mobile Telecommunication System—Terrestrial Radio Access) communication systems.

BACKGROUND OF THE INVENTION

The demand for high bandwidth wireless communications is unrelenting and, as such, the requirements placed upon cellular networks are always increasing. In particular with the onset of wireless multimedia communications it is desirable to be able to offer high data rate communications in both directions of a cellular communication system, i.e. to and from a wireless subscriber communication unit.

However, as radio spectrum is such a precious resource, it is typical that radio frequencies used in one cell (coverage area) may be used simultaneously by the adjacent cells (typically other overlapping coverage areas) as well. In addition the resources used within one cell may be simultaneously shared amongst several users connected to that cell. Thus, in a cellular network there may be several simultaneous communications occurring on the same frequency, or same set of frequencies, as well as the same time instances.

At a receiving communication unit in such a communications network, be it a wireless subscriber communication unit or a base station, 'composite' signals arrive that correspond to the desired communication signal and also that represent several possible simultaneous interfering communication signals occurring on the same frequency. These latter communications represent interference at the receiving communication unit, the effects of which need to be mitigated in order to successfully demodulate the desired communication signal.

Typically, the data rate that is sustainable in a communication link is proportional to a received level of the desired signal above a level of any interfering signal(s) and noise, referred to as the Signal to Interference plus Noise Ratio (SINR) or sometimes shortened to just SNR. Thus, a higher data rate is generally more achievable at a high SINR (or SNR) than at a low SINR (or SNR).

In a congested cellular environment with many wireless subscriber communication units requiring simultaneous communication links, the interfering signals tend to dominate the background noise and, thus, the interference is the aspect that dictates the achievable communication data rate. This is referred to as an interference limited environment. It is thus clear that if the interference could be removed then a higher SNR could potentially be achievable with a commensurate increase in the communication data rate.

The interfering signals typically originate from three possible sources, namely:
other simultaneous communication links from within the same cell of the same communication system, this is generally referred to as intra-cell interference;
simultaneous communications links from other cells of the same communication system, this is generally referred to as inter-cell interference;
simultaneous communication links from other communications systems, such as leakage from communications systems operating in adjacent frequencies, other communications systems operating in the same frequency spectrum, i.e. unlicensed spectrum, etc.

Most advanced cellular communications systems have been designed in order that either the intra-cell interference is avoided or can be readily removed at the receiving device. For instance in TD-CDMA the intra-cell interference is detected and, hence, removed as part of the receiver processing using a multi-user detector (MUD), whilst in OFDM intra-cell interference is typically avoided by using orthogonal tones for different simultaneous users within the same cell.

Interference due to simultaneous communication links from other communication systems is somewhat more difficult to remove. In principal this may be performed as part of receiver processing using additional signal processing techniques.

Inter-cell interference is difficult to avoid on a network-wide scale, in that it would require a scheduler to allocate orthogonal resources to simultaneous users across many cells within the network. Thus, one method for removal of inter-cell interference is to allow the receiving communication units in the network to detect signals not only from the sources in the same cell, but also simultaneously from other cells within the communications network. This could be described as an advanced or inter-cell capable multi-user detector (MUD), a description of which can be found in GB412036.

The aforementioned prior art refers to the case when all the communications signals are synchronous or approximately synchronous (sometimes referred to as being 'block' synchronous). In the context of this patent specification, synchronous or block synchronous may be defined as encompassing a case where the separate communications signals are received within a certain predefined window. This predefined window will typically be a small percentage of the timeslot, burst etc. For instance, in the TD-CDMA case, this window will typically be equivalent to the channel estimation window, whilst in the OFDM case this window will be typically equivalent to the cyclic prefix duration.

However, the detection of inter-cell interference becomes significantly more complicated when the signals arrive at the receiving device in a substantially asynchronous manner. This may arise due to either the cells in the network being unsynchronised or the distance between cells being large enough such that propagation times of the various communications propagation paths are substantially different.

Figure 1:
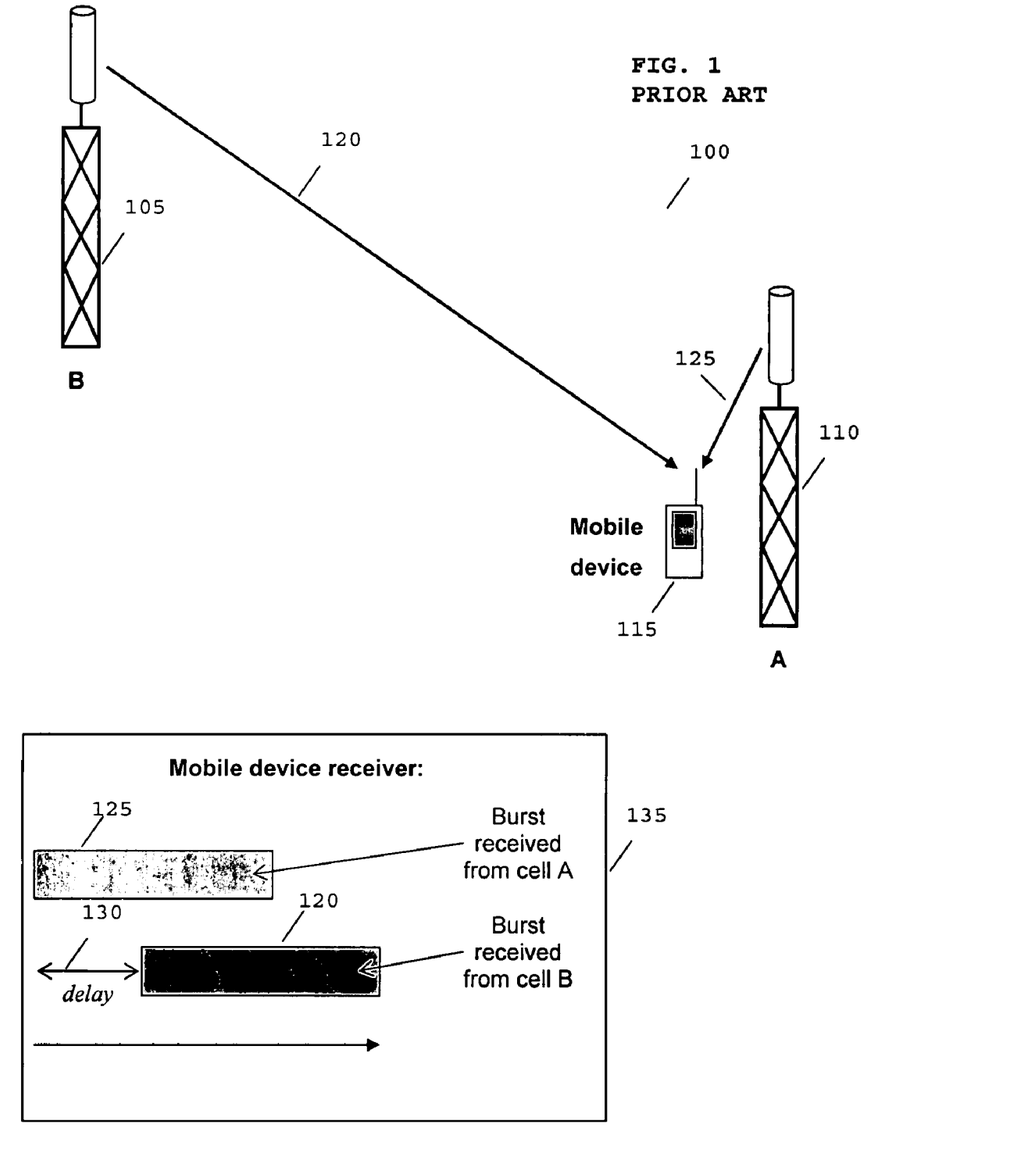
FIG. 1 illustrates a known simplified representation diagram highlighting propagation distances in a synchronized downlink cellular communication system.

This latter case is illustrated in FIG. 1 for the downlink scenario. In FIG. 1 time-synchronised cellular base stations 105, 110 are respectively transmitting a burst 120, 125, which is received at a wireless subscriber communication unit 115, where a burst is a generic term often used to include a communication frame, slot, burst, sub-frame, timeslot, block of data, etc. As illustrated, the receiving communication unit is located substantially closer to cell A's transmitter 110 than cell B's transmitter 105. Thus, although the bursts 120, 125 were transmitted simultaneously, when they are received at the receiving communication unit 115 the bursts appear highly 'asynchronous' as can be seen from the inset timing diagram 135. The delay 130 is proportional to the difference in the propagation path distances from the respective base stations 105, 110 to the receiving communication unit 115. It should be noted that although the illustration is for the downlink scenario (communication from a base station to a receiving subscriber communication unit) it equally applies to the uplink (communication from a transmitting subscriber communication unit to a base station), i.e. the base stations and subscriber communication units are interchanged in the illustration.

To optimally detect asynchronous interfering signals at a receiving device the signal processing within the receiver, and/or the structure of the communicated signal, must be designed to cope with a maximum length of the expected delays 130. To highlight this we refer to the examples of TD-CDMA and OFDM mentioned previously.

In TD-CDMA, the most common method of signal detection at the receiving device is to employ a linear MUD. Such an algorithm essentially performs a matrix operation on a vector of received signals to separate the signal into its constituent signal components. In the most common realisations of the linear MUD the key step is the inversion of a system matrix, which describes the structure of the signals of the various simultaneous communications links and the propagation channels that these signals have been subjected to. This can be extended to include inter-cell communications signals as described in GB412036. With such methods the complexity of the detection operation is directly linked to duration of the propagation channels assumed in the system matrix, with a longer duration propagation channel leading to considerable additional complexity in the detection operation.

Thus, optimal detection of inter-cell TD-CDMA signals would require the channel window of the MUD to be of sufficient duration to encompass the expected asynchronicity of the desired signal component and the inter-cell communication signals, illustrated in FIG. 1. If the cellular communication system is asynchronous, or the communication signals are expected to traverse large distances, then this channel window quickly becomes unacceptably large and leads to practically unrealisable detection algorithms in the receiving communication unit. Thus, in practice, a MUD would be designed with a channel window that is acceptable from an implementation perspective and then the level of asynchronicity tolerated within the receiver architecture would be governed by this channel window, to enable signals arriving within the channel window to be detectable. Thus, signals with a delay, which are greater than the implemented channel window, would remain undetected.

In 3GPP High Chip rate TD-CDMA, the burst structure is typically designed to allow a channel window of 57-64 chips, which represents a small percentage of the total burst duration of 2560 chips. Typically, a MUD for this application would then be designed to accommodate this channel window duration. Thus, it is clear that only a limited amount of asynchronicity could be tolerated in such a system before inter-cell communication signals become undetectable and, hence, the inter-cell interference ceases to be mitigated.

An OFDM system employs bursts or symbols that typically comprise a data portion and a cyclic prefix, or suffix. For simplicity, within the hereinafter described implementation, we refer to only the case of a cyclic prefix. However, a skilled artisan will appreciate that the inventive concept may be applied to either a cyclic prefix or cyclic suffix. The cyclic prefix is analogous to the channel window in TD-CDMA as described above. That is to say that the cyclic prefix is provided to allow for any multipath delays experienced by the communication signal as it travels through the propagation environment. The cyclic prefix is formed by copying the last few samples of the data portion of the burst and appending these to the front of the data portion, thus making a cyclically symmetric burst or symbol. In an OFDM receiver, the data portion is extracted from the cyclic prefix and converted to the frequency domain where the individual tones are orthogonal. If a tone constitutes communication signals from multiple cells these may be optimally separated.

However, if the data extraction of the OFDM burst is not aligned correctly, and starts earlier than the start of the cyclic prefix or later than the end of the cyclic prefix, the extracted portion will no longer be cyclically symmetric. Thus, once converted to the frequency domain the individual tones are not orthogonal and optimal detection of the various communication signals is no longer a feasible operation.

Thus, in a similar manner to TD-CDMA, it is clear that only a limited amount of asynchronicity can be tolerated before inter-cell communication signals become undetectable in an OFDM implementation and, hence, the inter-cell interference ceases to be mitigated by conventional means.

The above examples serve to demonstrate the failings of the prior art when the interfering signals are substantially asynchronous. This situation represents an unsynchronised cellular communication system, or one with considerable distances between each of the cells or in fact one where another communication link is not necessarily part of the cellular communication system.

SUMMARY OF THE INVENTION

Accordingly, embodiments of the invention seek to mitigate, alleviate or eliminate one or more of the abovementioned disadvantages singly or in any combination.

According to a first aspect of the invention, there is provided, a communication unit. The communication unit comprises a receiver for receiving a composite communication signal that comprises a desired signal and at least one asynchronously received interfering signal. The receiver comprises detector logic arranged to detect and process the composite communication signal as if the at least one asynchronously received interfering signal were synchronously received with the desired signal.

Embodiments of the invention may allow improved use of the communication resource in the communication system, for example by providing a more accurate estimate of a received signal in a communication system where interfering (and substantially asynchronous) signals are present.

Embodiments of the invention may allow a communication link to operate in a presence of significant levels of interference, from say another simultaneous link, where the two (or more) communication links are considered to be time asynchronous.

Embodiments of the invention may allow improved performance as perceived by the end-users, for example by allowing a communication link to operate at a higher signal-to-noise ratio (SNR) and, hence, provide a commensurate increase in data throughput.

According to an optional feature of the invention, the communication unit may further comprise synchronisation logic, operably coupled to the detector logic, for receiving the composite communication signal and synchronising a timing of the communication unit to both the desired signal and the at least one asynchronously received interfering signal.

According to an optional feature of the invention, the communication unit may further comprise channel estimation logic, operably coupled to the detector logic, for receiving the desired signal and the at least one asynchronously received interfering signal, wherein the channel estimation logic is operable to receive the desired signal independently of the at least one asynchronously received interfering signal.

According to an optional feature of the invention, the detector logic may discard the at least one asynchronously received interfering signal subsequent to performing a detection operation.

According to an optional feature of the invention, the detector logic may be arranged to perform a filtering operation that disregards at least one of: a timing of the at least one asynchronously received interfering signal; and a phase shift of the at least one asynchronously received interfering signal. In this manner, the detector logic may process the at least one asynchronously received interfering signal within a process window of the received desired signal in response to the filtering operation.

According to an optional feature of the invention, the detector logic may comprise at least one of the following: a joint detector; a linear detector; a multi-signal detector; a multi-user detector.

According to an optional feature of the invention, the composite communication signal may comprise at least one burst of a time-slotted communication signal, which may, in some embodiments, be a time-division code division multiple (TD-CDMA) access communication signal or an orthogonal frequency division multiplexed (OFDM) communication signal.

According to an optional feature of the invention, the communication unit may be a wireless base station or a wireless subscriber communication unit.

According to an optional feature of the invention, the communication unit may be arranged to support $3^{rd}$ Generation Partnership Project (3GPP) cellular communications. Thus, embodiments of the invention may be compatible with some existing communication systems, such as 3GPP TD-CDMA or TD-SCDMA cellular communication systems.

According to a second aspect of the invention, there is provided a method for interference mitigation in a communication system. The method comprises receiving a composite communication signal that comprises a desired signal and at least one asynchronously received interfering signal. The method further comprises detecting and processing the composite communication signal as if the at least one asynchronously received interfering signal were synchronously received with the desired signal.

According to a third aspect of the invention, there is provided an integrated circuit. The integrated circuit comprises logic for receiving a composite communication signal that comprises a desired signal and at least one asynchronously received interfering signal. The integrated circuit further comprises detector logic arranged to detect and process the composite communication signal as if the at least one asynchronously received interfering signal were synchronously received with the desired signal.

According to a fourth aspect of the invention, there is provided computer program product. The computer program product comprises program code for interference mitigation in a cellular communication system. The computer program product comprises program code for receiving a composite communication signal that comprises a desired signal and at least one asynchronously received interfering signal, and detecting and processing the composite communication signal as if the at least one asynchronously received interfering signal were synchronously received with the desired signal.

According to a fifth aspect of the invention, there is provided a communication system. The communication system comprises a communication unit operable to receive a composite communication signal that comprises a desired signal and at least one asynchronously received interfering signal. The receiver comprises detector logic arranged to detect and process the composite communication signal as if the at least one asynchronously received interfering signal were synchronously received with the desired signal.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example, with reference to the accompanying drawings, in which.

DETAILED DESCRIPTION

Embodiments of the invention include a sub-optimal method for detection at a receiving communication unit that alleviates one or more of the aforementioned problems with receiving substantially asynchronous communication signals. The proposed wireless communication unit and method of detection may allow the simultaneous detection of substantially asynchronous communications signals, thus providing interference mitigation capabilities in such an environment. This, in turn, may allow the communications link to operate at a higher signal-to-noise ratio (SNR) and, hence, provide a commensurate increase in data throughput.

As will be appreciated by those skilled in the art, and from the brief description of the problem provided in the previous section, the optimal detection of substantially asynchronous interfering signals at a receiving device is a highly complex operation. However, by applying some sub-optimal approximations to the receiving problem, substantially asynchronous interfering signals may be detected at a receiving device and, hence, their interference mitigated. Embodiments of the invention are of particular relevance to a communication system where the signals are transmitted in a burst and/or time-slotted format, for example where units or chunks of data are packaged together and are transmitted over the air interface in a block, burst, or timeslot, form, etc.

The inventive concept is described with respect to time division code division multiple access (TD-CDMA) embodiments that are consistent with the aforementioned block, burst, or timeslot, air-interface form. However, the inventive concept may be readily applied to any other block, burst, or timeslot, air-interface form, such as an orthogonal frequency division multiplex (OFDM) air-interface implementation.

In a TD-CDMA implementation, it may be possible to eliminate the explicit synchronisation procedures employed for the asynchronous interfering signals.

Although the description herein of embodiments of the invention refers to a linear detector, for example, a detector of a form of de-correlator or minimum mean-square error (MMSE) linear detector, other detector technologies may be employed, and the inventive concept is not limited to a linear detector.

In accordance with embodiments of the invention, the inventive concept is described hereafter with respect to a multi-signal detector, which may also be referred to as a multi-user detector, joint detector, multi-chip equalizer, etc., as known in the art.

The inventive concepts described herein may be employed in either an uplink or downlink transmission direction. Thus, embodiments of the invention will be described with respect to a signal detection operation in a receiver, irrespective of whether a Node B (or base station) or User Equipment (or other wireless subscriber communication unit) employs the receiver.

Additionally, the inventive concepts are not limited to cellular communication systems, but are applicable to any wireless communication system or wireless communication unit employing a burst or time-slotted receiver.

In summary, embodiments of the invention are described with respect to, and focused on, detection methods that are applicable to the Universal Mobile Telecommunication System's (UMTS) Terrestrial Radio Access Network (UTRAN) specification. Such a UTRAN system and its operation are described more fully in the $3^{rd}$ Generation Partnership Project (3GPP) technical specification documents 3GPP TS 25.401, 3GPP TS 23.060, and related documents, available from the 3GPP website at www.3gpp.org, and need not be described in more detail herein.

Figure 2:
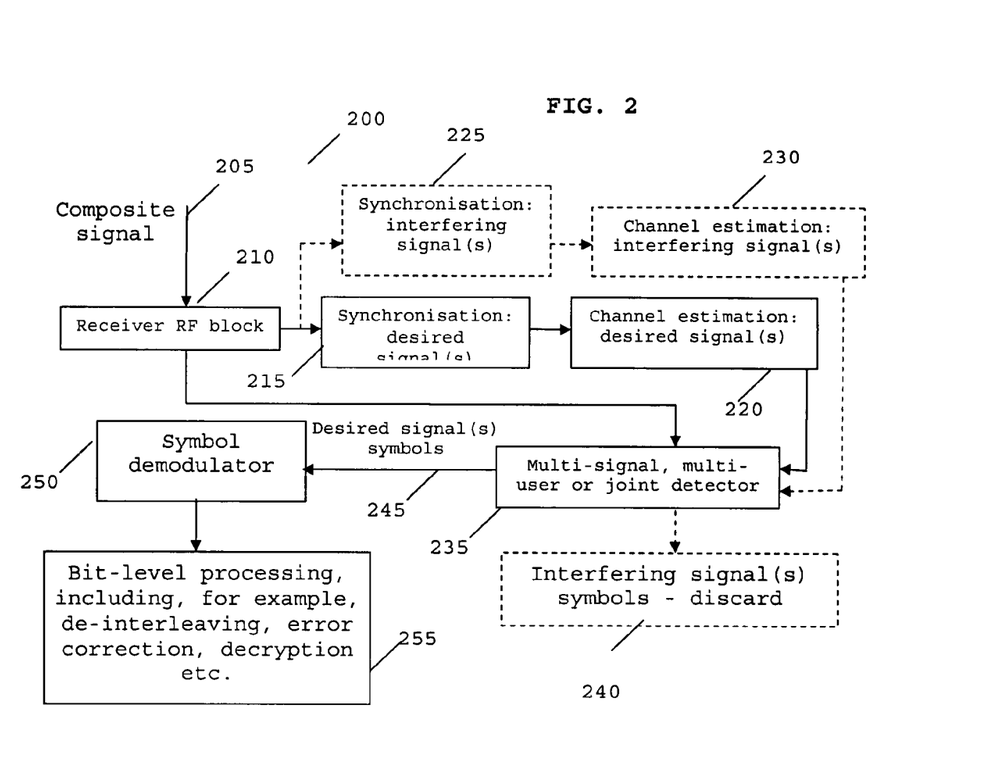
FIG. 2 illustrates a receiver of a communication unit adapted in accordance with embodiments of the invention.

Turning now to FIG. 2, a block diagram of receiver signal processing logic 200 of a wireless communication unit that is adapted in accordance with embodiments of the invention is shown. As will be appreciated by a skilled artisan, the described embodiments of the invention, for example the block diagram of a receiver signal processing logic 200, may apply equally to both a wireless subscriber communication unit as well as a base station unit.

The receiver signal processing logic 200 comprises a number of radio frequency (RF) receiver circuits grouped and shown as receiver block 210, receiving a composite RF input signal 205. The RF receiver block 210 may comprise, for example, RF amplification, RF down-mixing, appropriate filtering to filter out undesired adjacent-channel signals and an analogue to digital converter for conversion of the received analogue signal to a digital equivalent.

Figure 3:
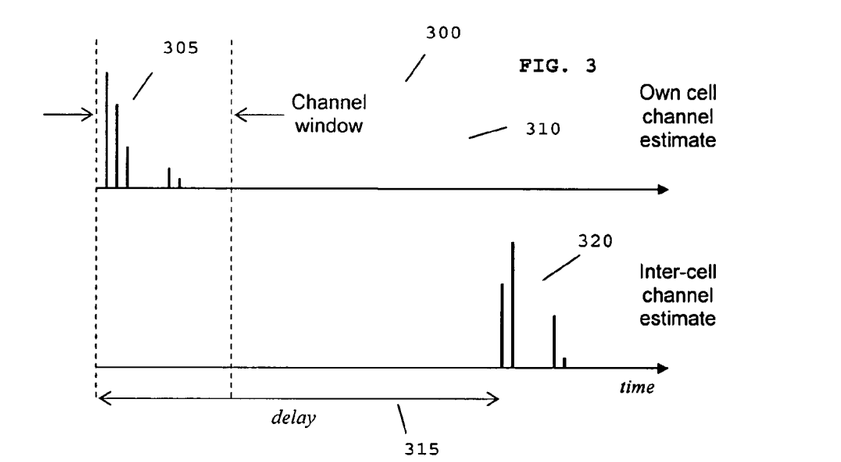
FIG. 3 illustrates a series of inter-cell waveforms of channel estimates of both interfering and desired signals to clarify use of a channel window in a cellular system in accordance with embodiments of the invention.

The digital output of the RF receiver block 210 is provided to synchronisation logic 215 arranged to synchronise the receiver to a desired signal. In embodiments of the invention, the digital output of the RF receiver block 210 may also be provided (in parallel) to further synchronisation logic 225 arranged to synchronise the receiver to one or more received interfering signal(s). The output of the synchronisation logic 215 is input to channel estimation logic 220 to perform a channel estimation of the desired signal, as illustrated in FIG. 3. Similarly, in accordance with embodiments of the invention, the output of the synchronisation logic 225 may also be input to channel estimation logic 230 to perform a channel estimation of the one or more interfering signal(s).

The output of the desired channel estimation logic 220, together with the output(s) of the interfering channel estimation logic 230, is/are input to a detector 235, which may be a multi-signal detector, a multi-user detector or joint detector. The detector 235 has been adapted to jointly decode desired signals and one or more interference signals in accordance with embodiments of the invention, as described hereinafter with respect to FIG's 3 to 6. Thus, the detector 235 may extract the desired symbols 245 and discard the interfering signal(s) symbols 240.

Once the correct desired signal(s) symbols have been extracted, they are input to symbol demodulator logic 250 to demodulate the received signal.

The output of the demodulator 250 may then provide a demodulated signal to further signal processing logic 255, which may comprise bit-level processing, de-interleaving, error correction, de-cryption, etc.

The adaptation of the detector 235 will now be described with respect to TD-CDMA embodiments of the invention.

In a cellular communication system employing a TD-CDMA air-interface technology, it is common to use what is generally referred to as a multi-user detector (MUD) to perform detection of the received signal at the receiver to mitigate the effects of intra-cell interference. The operation of the MUD may be extended to include detection of spreading codes from other cells to identify inter-cell interference, provided some knowledge of the interfering signal can be obtained and the interference is approximately synchronous or block synchronous. Examples of this technique may be found in the document titled 'Co-channel Interference Mitigation detectors for Multirate Transmission in TD-CDMA Systems', by Piero Castoldi and Hisashi Kobayashi, published in IEEE JSACm Vol. 20, No. 2, February 2002.

In accordance with embodiments of the invention, in a TD-CDMA case, joint detection of both desired and interfering signals is performed. In the TD-CDMA implementation, a timing delta is determined between the absolute timing of the received desired and one or more received interfering signals within the received composite signal. As known, the absolute timing of the desired signal may be obtained using any known synchronisation or tracking procedure. The absolute timing of the one or more interfering signal(s) may be acquired either: using a separate synchronisation/tracking procedure or using a channel estimation procedure employing a larger search window.

Thereafter, and in accordance with embodiments of the invention, the determined absolute timing of the interfering signal is adjusted so that its channel estimate falls within a detection window of the desired signal. The complexity of the joint detection operation in detector 235 is related to a size of the detection window. Thus, and advantageously, time-shifting the interfering signals' absolute timing in a TD-CDMA implementation results in a joint detection operation that is able to receive and process asynchronously received desired and interfering signals, but assume that the signals are synchronously received, such that both channel estimates lie within the same normal sized window. That is, the joint detection operation in detector 235 is able to detect and process the composite communicate signal as if the asynchronously received interfering signal were synchronously received with the desired signal. In this manner, the channel estimator logic separately performs a channel estimate of both the desired and interfering component(s) of the composite signal. Hence, and advantageously, non-prohibitively complex joint detection can be performed.

To perform the detection process in detector 235 correctly the timing information of both the desired signal and interfering signals should be taken account of. Nevertheless, in an attempt to provide an alternative view of the aforementioned inventive concepts, let us consider the concepts as discarding the absolute timing information of the interfering signal and only using its channel estimate in the joint detection process. Notably, the joint detection process in taking into account both timing information of both the desired signal and interfering signals is prohibitively complex if the signals are highly asynchronous.

Hence, in accordance with embodiments of the invention, a sub-optimal approximation to the system model may be used, inasmuch as the detector uses all of the extracted information about the desired signal but only part of the information about the one or more interfering signal(s). This typically provides better performance than the traditional approach of ignoring the asynchronous interference altogether.

The time-shifting operation (or removal of absolute timing of the interfering signal) may well lead to some corruption of the detected interfering signal, but as this detected interfering signal is discarded it is of no relevance. An important aspect from a performance perspective is that the interfering signal was assumed to be present when the joint detection was performed and, hence, better performance can be obtained, as using some gleaned information about the interfering signal is better than having no information about the interfering signal.

In accordance with embodiments of the invention, the joint detection process involves the detector 235 generating a system matrix, for example a matrix describing the transmission of the various signals. Columns of the system matrix are formed by convolving an effective spreading code of the signal to be detected with an estimate of the propagation channel from the transmitter to the receiver, as implemented in channel estimation logic 220, 200 of FIG. 2.

In a TD-CDMA case, the joint detection logic 235 performs an inversion of the system matrix (or another matrix that is based upon the system matrix), in one form or another, for example, where an inversion is explicitly performed. This is particularly true for the linear detection techniques discussed, such as linear minimum mean squared error (LMMSE) or zero-forcing (ZF) etc. That is, in the linear techniques a model of the system (i.e. system matrix) is built and then inverted to obtain the desired result.

In one embodiment, the system matrix (i.e. a matrix describing the transmission of the various signals) consists of vectors that are formed by convolving the effective spreading code of the signal with an estimate of the propagation channel from the transmitter to the receiver. The respective channel estimate performed in the detection process may be described mathematically as:

$$b_k = x_k * \hat{h}_k \quad [1]$$

where:

$x_k$ is the effective spreading code of the $k^{th}$ signal to be detected, $\hat{h}_k$ represents the estimated discrete time propagation channel that the $k^{th}$ signal experiences in transmission to the receiver, and represents a convolution operation.

The effective spreading code may comprise, as in the case of the UMTS 3GPP high chip rate standard, a spreading code and a cell specific scrambling code and is typically of short duration, for example 16 chips in this example (where the physical layer specification in 3GPP is described in TS25.221, and the portions describing the implementation of scrambling and spreading codes, etc. may be found at TS25.221 and TS25.223.). The estimated channel impulse response is designed to cope with expected multipath propagation delays in the cellular environment. For the standard referred to above, this depends upon the burst structure in operation, but is typically either 57 or 64 chips in duration.

Thus, the maximum length of system matrix vector is typically less than or equal to 79 chips.

In one embodiment, the system matrix vectors for all the K signals to be detected are concatenated to form a system sub-matrix B as demonstrated in equation [2]. Multiple system sub-matrices are then concatenated with zero-padding offsets to form the system matrix A as shown in equation [3]. The length of the zero-padding offsets applied above to each sub-system matrix in the formation of A, are multiples of the effective spreading code length, i.e. 16 chips in the example. Thus the system matrix A is a block-banded diagonal matrix.

$$B = [b_1, b_2, \ldots, b_K] \quad [2]$$

$$A = \begin{bmatrix} B & & & 0 \\ & B & & \\ & & B & \\ & & & \ddots & \vdots \\ 0 & & & \cdots & B \end{bmatrix} \quad [3]$$

In the event that receive diversity is employed, then multiple system matrices are formed from the channel estimates of the respective receive antennas and these are then vertically stacked to obtain the overall system matrix. However, for the sake of clarity this is omitted in the equations presented.

Linear MUD techniques commonly employed in TD-CDMA systems require the inversion of the system matrix as described in [3] or the inversion of a matrix constructed from the system matrix. The complexity of this inversion is dependent upon the depth of the block-banded diagonal of the matrix. As a number of rows in the block-band increase, or equivalently the number of rows in the system sub-matrix B increase, the complexity of the inversion increases dramatically.

Figure 5:
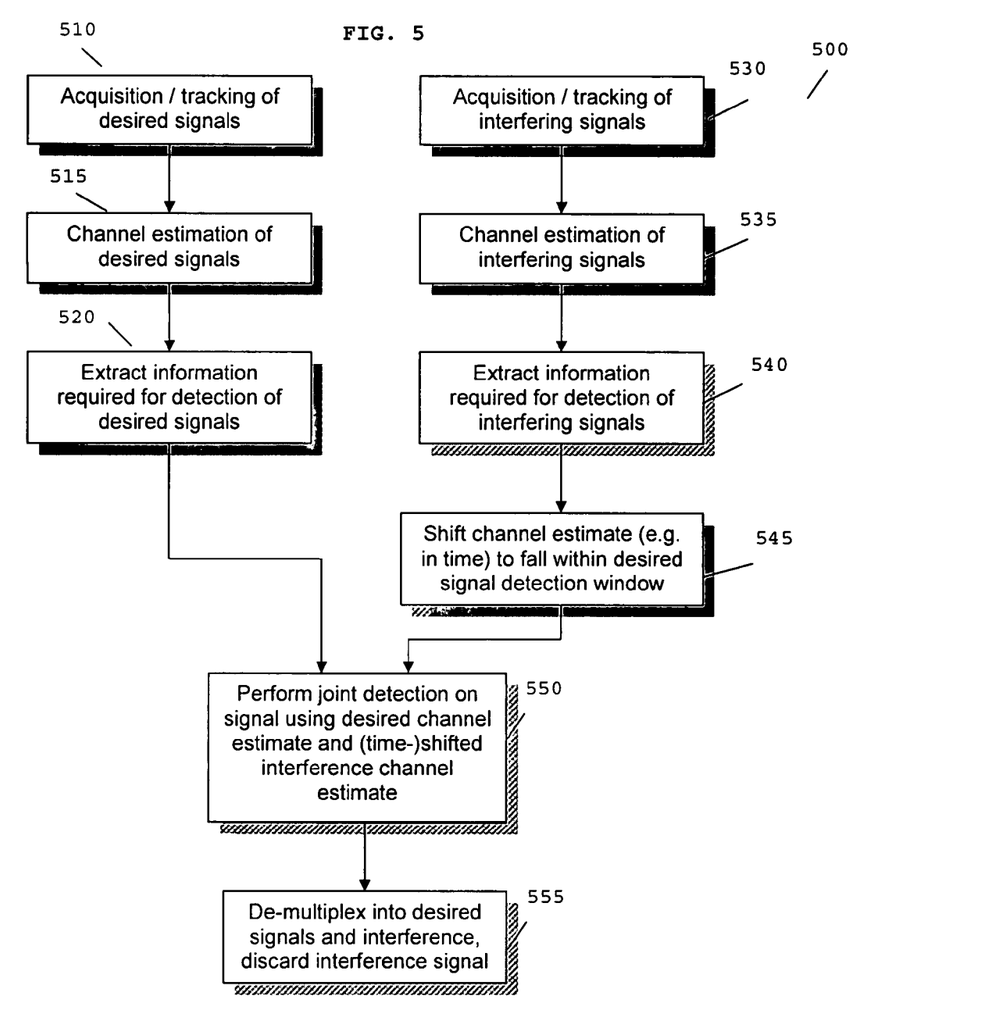
FIG. 5 illustrates a flowchart of a signal acquisition, tracking and channel estimation mechanism in accordance with embodiments of the invention.

For the scenario when there is asynchronous inter-cell interference, the channel estimates for the separate signals are obtained independently, as illustrated in FIG. 5, typically (although not necessarily) via a correlation of the received signal with a set of known channel estimation sequences.

Referring now to FIG. 3, a series of inter-cell channel estimates, of both interfering and desired signals, are illustrated to clarify use of a channel window in a wireless communication unit in accordance with embodiments of the invention. The channel estimates of the desired cell signals 310 and the interfering signals 320 are separated by a delay 315, as shown. This delay 315 is due to a difference in arrival time between the desired burst and the interfering burst.

In order to properly account for this delay 315 in the system matrix, the columns of the system matrix in Equation [1] need to be suitably long. For example, the desired cell channel estimate is located in the channel window 305 typically comprising '57' or '64' chips as discussed previously. However, the interfering channel estimate has a delay 315 that can be several times (up to 20 times) this delay before the start of its channel estimate. This means that the estimated channel impulse response for the interfering signal will have zeros at the start corresponding to the duration of the delay. This will lead to the system sub-matrix having substantially more rows (up to 20 times as many for the present example) and, hence, the complexity of the inversion of the system matrix is prohibitive.

Figure 4:
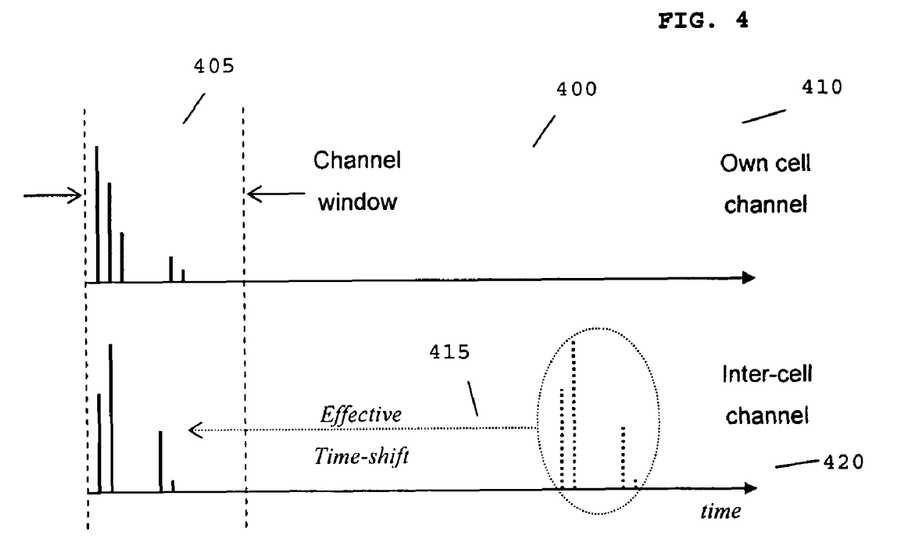
FIG. 4 illustrates a series of inter-cell waveforms including own cell channel estimates and time-shifted channel estimates of interfering signals in accordance with embodiments of the invention.

Referring now to FIG. 4, a series of inter-cell waveforms 400 are illustrated including desired cell channel estimates 415 and time-shifted channel estimates 420 of interfering signals, in accordance with embodiments of the invention.

Thus, in accordance with embodiments of the invention, the interfering signals' channel estimates are purposely shifted in time such that they occur within an acceptable channel window 405, as shown in FIG. 4. The system sub-matrix is now constructed with channel estimates of duration, for example, 57 or 64 chips and, hence, the inversion of the system matrix is of a similar complexity to the approximately synchronous case that is currently known.

At the output of the linear detector the symbols are demultiplexed into those from desired signals and those from the asynchronous interfering signals. Due to the nature of the time-shift performed upon the interfering channel estimate, the detected output symbols from the asynchronous interfering signal may either be delayed or delayed and corrupted and, thus, they are discarded. This approximation works due to the fact that certain types of detector make no assumption about the constellation of the output symbols and, therefore, only those output symbols associated with the non-time-shifted channel estimates (the desired signals) necessarily appear at the correct locations in the output constellation.

In embodiments of the invention, the inventive concept may be applied to a cellular communication system employing an OFDM air-interface technology, where intra-cell interference is commonly avoided by using orthogonal tones for different simultaneous users within the same cell. Synchronisation is typically obtained by correlating the time-domain received signal with a known synchronisation sequence. In known OFDM systems, known frequency domain pilots are extracted from orthogonal tones and used to provide a basis for the frequency domain channel estimate of the own cell signals. This channel estimate may be used to phase and amplitude equalise each of the orthogonal tones enabling the correct demodulation into the transmitted modulated symbols. In the case of a simultaneously received interfering OFDM burst the channel estimates from both bursts may be used to further separate the individual orthogonal tones into constituent desired and interference signals. If, however, there are interfering bursts or OFDM symbols present that are substantially asynchronous to those of the desired signals, when the desired burst data payload extraction is performed, as outlined above, the extracted portion of the interfering burst or OFDM symbol is not necessarily cyclically symmetric. Thus, when demodulated into the frequency domain the interfering tones are not orthogonal. This may have the consequence that the known pilots of the interfering burst or OFDM signal being corrupted and, hence, accurate channel estimation of the interfering signal may be difficult or impossible. This further leads to the potential inability to separate the detected tones into their constituent desired and interfering signals. A skilled artisan will appreciate that the aforementioned inventive concept may be applied to an OFDM implementation by separately channel estimating the desired and interfering signal components, thereby obtaining non-corrupted channel estimates of the constituent signals, and utilising some information of the interfering signals (discarding absolute time information) to therefore approximately separate the received signal into its constituent desired and interfering components. Thus, the joint detector logic in OFDM embodiments of the invention differs from the known OFDM joint detector logic, as it is capable of handling interfering signals that are substantially asynchronous and not just signals that are assumed to be synchronous.

Referring now to FIG. 5, a flowchart 500 illustrates a signal acquisition, signal tracking and channel estimation mechanism according to embodiments of the invention. The flowchart 500 commences with a communication unit's detector processing a received signal and determining therefrom signal acquisition and signal tracking of desired signals, as shown in block 510. The signal acquisition and the tracking of the desired signals may be performed in accordance with known techniques related to the air interface technology employed within the communication system. The communication unit's detector logic performs channel estimation of these desired signals, as shown in block 515. The channel estimation is performed in order to establish an estimate of the propagation channel that the desired signals have been subjected to, in transmission from the transmitter to the receiver. Additionally, the communication unit's detection logic may then extract information required for detection of desired signals, as shown in block 520. Such further information may be extracted from the channel estimation process that aids detection, such as information relating to spreading codes present in a CDMA system or the modulation scheme in operation in an OFDM system, for instance.

Concurrently, in accordance with embodiments of the invention, the communication unit's detector logic processes the received signal and determines therefrom, signal acquisition and signal tracking of interfering signals, as shown in block 530. The communication unit's detector logic performs a channel estimation of these interfering signals, as shown in block 535. The communication unit's detector logic may then extract whatever information it is able to about the nature of the interfering signals, as shown in block 540. This information is typically less than or equal to the amount of information available regarding the desired signals, due to the otherwise excessive requirements of the communications system to inform all the receiving communication units of all potential simultaneous communication signals.

In embodiments of the invention, another block (not shown) may be used to establish a time delay between desired signals and the interfering signals. This may be established using the acquisition, tracking or channel estimation information determined in the previous blocks.

Henceforth, the communication unit's detector logic shifts the channel estimate of the interfering signals in time such that the processed interfering signals are located within a desired signal detection window, as shown in block 545. The interfering signal's channel estimates may be effectively time-shifted by an amount that brings the interfering signal within the channel window of the detector. The time-shifting of channel estimates does not correspond to a physical shift of any entity, but an interpretation of where the interfering signals lie within the input composite signal (desired signal plus any interference plus noise). The channel window may be a detection window in a time-domain based communication system, such as for example TD-CDMA, or, say, a cyclic prefix length in a frequency-domain based communication system, such as OFDM.

In this manner, the detector logic establishes a presence and identity of any interfering signals within the received signal.

In embodiments of the invention, the processing of interfering signals by the detector logic may be performed in a serial manner to the processing of desired signals, as compared to a concurrent processing of interfering signals and of desired signals.

Thereafter, the communication unit's detector logic performs joint detection on the received signal using the information extracted from the desired channel estimate in block 520 and the time-shifted interference channel estimate from block 540, as shown in block 550. A suitable sub-optimal joint detection technique may be performed by assuming that the previously asynchronous signals are, in fact, synchronous or approximately synchronous signals (e.g. block synchronous signals).

The joint detected received signal is de-multiplexed into desired signals, i.e. symbols or chips etc., and interference signals, with the interference signals subsequently discarded, e.g., in a filtering operation, as shown in block 555.

In embodiments of the invention, the acquisition/tracking and channel estimation signal processing operations may be performed individually and explicitly, or in other embodiments of the invention, the acquisition/tracking signal processing operations may be performed as part of the channel estimation operation.

In embodiments of the invention, the signal acquisition and/or tracking and channel estimation procedures for the interfering signals may be performed in an exhaustive manner, if a finite set of signature sequences is employed, as will be appreciated by a skilled artisan. This is particularly the case where no prior knowledge of the nature of the interfering signals is available. In such embodiments, the signature sequences may be taken to be a generic term including, but not limited to, synchronisation sequences, and channel estimation sequences, for instance.

Alternatively, in embodiments of the invention, information may be available as to a nature of interfering signals that may be expected. In such alternative embodiments, a much smaller set of signature sequences may be searched to establish a presence, or not, of an interfering signal.

It is noteworthy that, due to the approximations performed, e.g. the time-shifting of the interfering signal channel estimation leading to an assumption of approximately synchronous signals, the interfering signals output from the detector, i.e. symbols, chips etc., may be erroneous. Specifically, these outputs may be time-shifted, phase rotated/distorted or even non-orthogonal (as a result of discarding the absolute time information of the interfering signals), for example they may still be considered as still interfering with each other. A notable advantage of this operation is that the presence of such interfering signals is accounted for during the detection of the desired signals, as compared to current systems where only synchronous interfering signals are accounted for. Hence, embodiments of the invention enable superior performance from the detector, namely a mitigation or partial mitigation of asynchronous interfering signals.

As noted above, the approximations performed in a detection method may lead to an output of detected interfering signals being corrupted. Thus, a detection method that is able to cope with an output of detected interfering signals being corrupted, may be employed. In this regard, the detection method may be one that makes no explicit assumption about a phase or even energy of the detected interfering signals. Suitable detection method candidates may include a class of linear MUD, such as a de-correlating receiver or a minimum mean-square error (MMSE) linear detector.

It is noteworthy that, in order to mitigate interfering signals with a linear detector, it may be required to provide one or more additional degrees of freedom, i.e. the more signals that are detected the more degrees of freedom that are needed to exploit this information using a linear detector for the detection process. This may be achieved by utilising some features of the signal, such as bandwidth expansion due to spreading in systems incorporating some aspect of CDMA and/or multiple antennas, in order to exploit the spatial domain.

It will be appreciated that, for clarity purposes, the embodiments of the invention described above may be used with different functional units and processors. However, it will be apparent that any suitable distribution of functionality between different functional units or processors, for example with respect to the detector, may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

The aforementioned method and apparatus for mitigation of asynchronous interference in a cellular communication system provides at least one or more of the following advantages:

It provides a more accurate estimate of a received signal in a communication system where interfering (and substantially asynchronous) signals are present.

The inventive concept may be applied to a TD-CDMA system or an OFDM system.

It allows a communications link to operate at a higher signal-to-noise ratio (SNR) and, hence, provide a commensurate increase in data throughput.

It allows the communications link to operate in the presence of significant levels of interference, from say another simultaneous link, where the two (or more) links are considered to be time asynchronous.

Whilst the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 6:
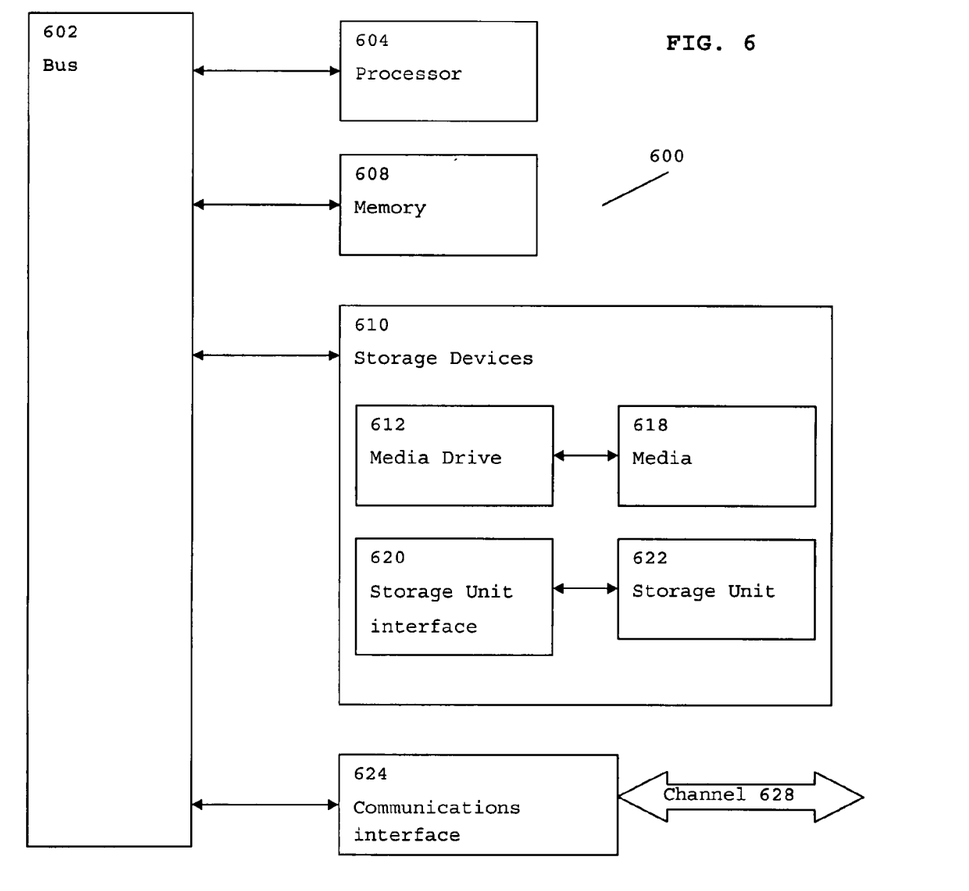
FIG. 6 illustrates a typical computing system that may be employed to implement processing functionality in accordance with embodiments of the invention.

FIG. 6 illustrates a typical computing system 600 that may be employed to implement processing functionality in embodiments of the invention. Computing systems of this type may be used in the Node B (in particular, the scheduler of the Node B), core network elements, such as the GGSN, and RNCs, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with embodiments of the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with embodiments of the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A communication unit comprising a receiver for receiving a composite communication signal that comprises a wanted signal and at least one asynchronously received interfering signal, the receiver comprising detector logic arranged to apply a time shift of a channel estimate of the at least one asynchronously received interfering signal of the composite communication signal such that the time shifted at least one asynchronously received interfering signal channel estimate is located within a processing window of the detector logic for processing the wanted signal.

2. The communication unit of claim 1 further comprising synchronisation logic operably coupled to the detector logic, wherein the composite communication signal is input to synchronisation logic for synchronising a timing of the communication unit to both the wanted signal and the at least one asynchronously received interfering signal.

3. The communication unit of claim 1 further comprising channel estimation logic operably coupled to the detector logic, wherein the wanted signal and the at least one asynchronously received interfering signal are independently applied to respective channel estimation logic.

4. The communication unit of claim 1 wherein the detector logic discards the at least one asynchronously received interfering signal subsequent to performing a detection operation.

5. The communication unit of claim 1 wherein the detector logic is arranged to ignore at least one of:
 a timing of the at least one asynchronously received interfering signal;
 a phase shift of the at least one asynchronously received interfering signal.

6. The communication unit of claim 5 wherein the detector logic processes the at least one asynchronously received interfering signal within a process window of the received wanted signal in response to the ignoring operation.

7. The communication unit of claim 1 wherein the detector logic comprises at least one from a group consisting of:
 a joint detector;
 a linear detector;
 a multi-signal detector;
 a multi-user detector.

8. The communication unit of claim 1 wherein the composite communication signal comprises at least one burst of a time-slotted communication signal.

9. The communication unit of claim 8 wherein the time-slotted communication signal is a time-division code division multiple (TD-CDMA) access communication signal.

10. The communication unit of claim 8 wherein the time-slotted communication signal is an orthogonal frequency division multiplexed (OFDM) communication signal.

11. The communication unit of claim 1, wherein the communication unit is arranged to support $3^{rd}$ Generation Partnership Project (3GPP) cellular communications.

12. The communication unit of claim 1, wherein the communication unit is a wireless base station.

13. The communication unit of claim 1, wherein the communication unit is a wireless subscriber communication unit.

14. A method for interference mitigation in a communication system comprising:
 receiving a composite communication signal that comprises a wanted signal and at least one asynchronously received interfering signal, and
 applying a time shift of a channel estimate of the at least one asynchronously received interfering signal such that the time shifted at least one asynchronously received interfering signal channel estimate is located within a processing window for processing the wanted signal.

15. The method of claim 14 further comprising synchronising a timing of the communication unit to both the wanted signal and the at least one asynchronously received interfering signal.

16. The method of claim 14 further comprising performing independent channel estimation of the wanted signal and the at least one asynchronously received interfering signal.

17. The method of claim 14 further comprising discarding the at least one asynchronously received interfering signal subsequent to performing a detection operation.

18. The method of claim 14 further comprising ignoring at least one from a group consisting of:
 a timing of the at least one asynchronously received interfering signal;
 a phase shift of the at least one asynchronously received interfering signal.

19. The method of claim 18 wherein processing the at least one asynchronously received interfering signal within a process window of the received wanted signal is performed in response to the ignoring operation.

20. The method of claim 14 wherein detecting comprises using at least one from a group consisting of:
 joint detecting;
 linear detecting;
 multi-signal detecting;
 multi-user detecting.

21. The method of claim 14 wherein the composite communication signal comprises at least one burst of a time-slotted communication signal.

22. The method of claim 21 wherein the time-slotted communication signal is a time-division code division multiple (TD-CDMA) access communication signal.

23. The method of claim 21 wherein the time-slotted communication signal is an orthogonal frequency division multiplexed (OFDM) communication signal.

24. The method of claim 14 wherein the method is applied in a $3^{rd}$ Generation Partnership Project (3GPP) cellular communication system.

25. An integrated circuit comprising:
 logic for receiving a composite communication signal that comprises a wanted signal and at least one asynchronously received interfering signal, and
 detector logic arranged to apply a time shift to a channel estimate of the at least one asynchronously received interfering signal such that the time shifted at least one asynchronously received interfering signal channel estimate is located within a processing window for processing the wanted signal.

26. A tangible computer program product having executable program code stored therein for interference mitigation in a cellular communication system, the program code operable for, when executed at a communication unit:
 receiving a composite communication signal that comprises a wanted signal and at least one asynchronously received interfering signal, and applying a time shift of a channel estimate of the at least one asynchronously received interfering signal such that the time shifted at least one asynchronously received interfering signal channel estimate is located within a processing window for processing the wanted signal.

27. A communication system comprising a communication unit capable of receiving a composite communication signal that comprises a wanted signal and at least one asynchronously received interfering signal, the receiver comprising detector logic arranged to apply a time shift to a channel estimate of the at least one asynchronously received interfering signal such that the time shifted at least one asynchronously received interfering signal channel estimate is located within a processing window for processing the wanted signal.

* * * * *